Nov. 10, 1925.

H. F. THOMAS 1,561,376

WATER CIRCULATING DEVICE

Filed Sept. 20, 1922   2 Sheets-Sheet 1

H. F. Thomas
INVENTOR

BY Victor J. Evans
ATTORNEY

Nov. 10, 1925.

H. F. THOMAS 1,561,376

WATER CIRCULATING DEVICE

Filed Sept. 20, 1922    2 Sheets-Sheet 2

H. F. Thomas
INVENTOR

BY Victor J. Evans
ATTORNEY

WITNESS:

Patented Nov. 10, 1925.

1,561,376

UNITED STATES PATENT OFFICE.

HERBERT F. THOMAS, OF SEATTLE, WASHINGTON, ASSIGNOR TO H. B. JAMESON.

WATER-CIRCULATING DEVICE.

Application filed September 20, 1922. Serial No. 589,432.

*To all whom it may concern:*

Be it known that I, HERBERT F. THOMAS, a citizen of the United States, residing at Seattle, in the county of King and State of Washington, have invented new and useful Improvements in Water-Circulating Devices, of which the following is a specification.

The object of the present invention is to provide an apparatus of a simple construction, but efficient in action, which will materially assist the circulation of water between the radiator and the cylinder jackets of an internal combustion engine for automobiles to materially assist in the cooling of the cylinders.

To the attainment of the foregoing and other objects which will present themselves as the nature of the invention is better understood, reference is to be had to the drawings which accompany and which form part of this application.

In the drawings:—

Figure 1:
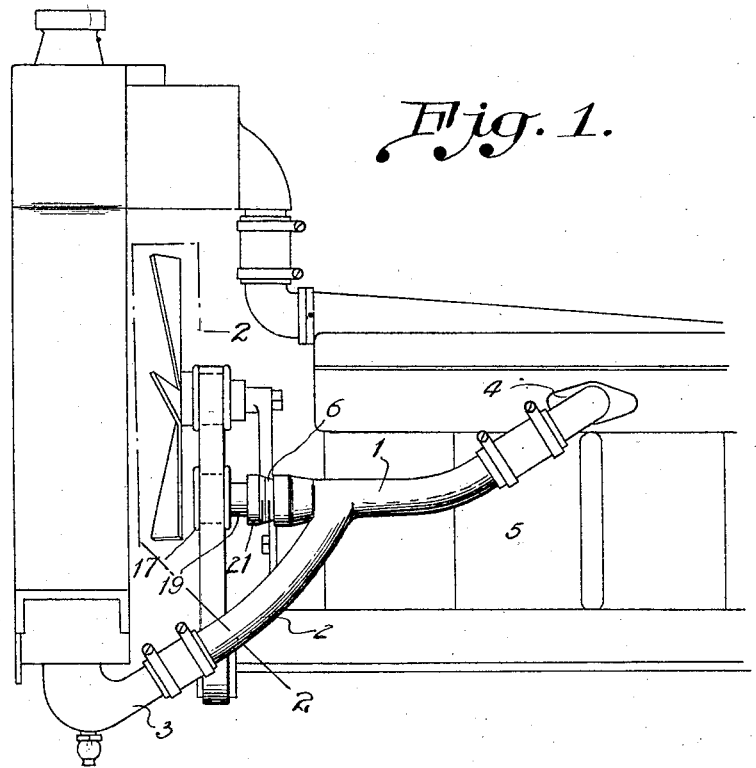
Figure 1 is a side elevation illustrating the application of the improvement.
Figure 2:
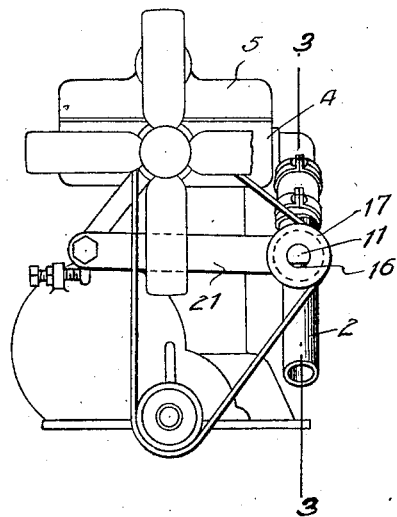
Figure 2 is a sectional view approximately on the line 2—2 of Figure 1.
Figure 3:
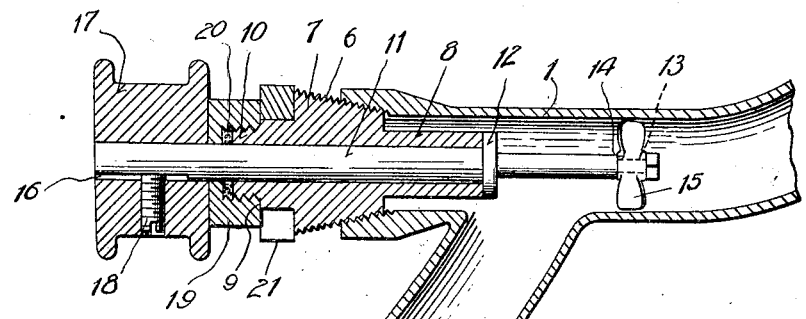
Figure 3 is a sectional view on the line 3—3 of Figure 2.
Figure 3:
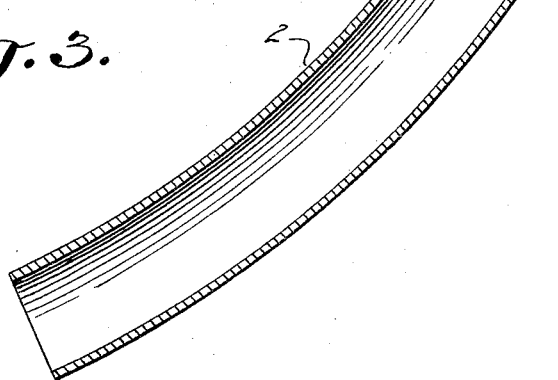
Figure 4:
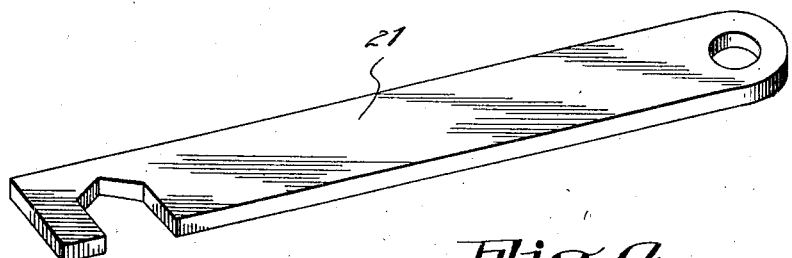
Fig. 4 is a perspective view of my bracket.

The body of my improvement is in the nature of a pipe casting, and includes a horizontal branch 1 and an angle branch 2. The angle branch has its end bent whereby the same may be readily connected to the outlet of the radiator 3. The horizontal branch has its inner end connected to the cylinders 4 of the internal combustion engine 5.

The outer end of the horizontal branch has a short extension from its connection with the angle branch 2, the same having interior threads and having screwed therein the threads on an annular frusto-conical enlargement 6 of a bearing member 7. The bearing member, from its threaded portion 6 is formed with a reduced extension 8 that enters the branch 1 of the pump casing, the said member, outward of its threaded portion 6 is reduced to provide an end shoulder 9 for a smaller extension 10 which is exteriorly threaded.

The bearing member has passed through the bore thereof a shaft 11, the said shaft having a shoulder 12 that is in slight contacting engagement with the inner end of the portion 8 of the bearing 7. The shaft 11 has its inner end provided with a reduced extension 13 whose outer end is threaded, and the said extension receives therethrough the hub portion 14 of a propeller 15. A suitable nut is screwed on the threaded end of the extension to bind the hub of the propeller on the shaft, but other means such as keys or splines may be also employed for this purpose.

The end of the shaft 11 projecting through the bearing block 7 is formed with a reduced portion or may be provided with a groove 16. On this end of the shaft a pulley wheel 17 is arranged, a binding element 18 passing centrally through the pulley to be received in the groove 16.

However, before the pulley is arranged on the shaft, I screw on the threaded extension 10 of the bearing block 7 a packing nut 19, a suitable packing 20 being received in the nut to surround the propeller shaft 11.

The fan belt, in the present instance, is of a greater length than those ordinarly employed, so that the same is made to travel over the pulley 17, so that an additional belt for revolving the shaft 11 is not required.

Of course, the inlet and outlet ends of the pump casing are attached to the radiator and to the engine cylinders by the usual short flexible hose members, and the pump casing is effectively supported on the device by a bracket 21, the same having one of its ends directly connected to the pump casing, and its other end secured by one of the bolts that connect the elements of the automobile frame.

The apparatus is of an extremely simple construction in which the parts constituting the same are removable and interchangeable, and it is thought that the foregoing description, when taken in connection with the drawings will fully set forth the construction and advantages of the apparatus to those skilled in the art to which such inventions relate.

Having described the invention, I claim:—

The combination with an internal combustion engine including a water circulating pipe, of a pipe fitting arranged in the water circulating pipe of a cooling system and having laterally disposed branches, one of such branches having one end threaded, a plug threaded in the latter and provided with a longitudinal bore, a shaft extending through the bore and provided with a water impelling blade at one end, a drive element fixed to the opposite end of the shaft and adapted to be driven from the engine, one end of the plug being reduced and formed with a many sided projection intermediate the ends of the plug, a horizontal bar supported from the engine and provided with a many sided notch in one end thereof which receives the projection, and a nut threaded on the reduced end of the plug and engaging the bar.

In testimony whereof I affix my signature.

HERBERT F. THOMAS.